United States Patent
Zheng et al.

(10) Patent No.: US 11,814,520 B2
(45) Date of Patent: Nov. 14, 2023

(54) THERMAL GAP FILLER AND ITS APPLICATION FOR BATTERY MANAGEMENT SYSTEM

(71) Applicant: DOW SILICONES CORPORATION, Midland, MI (US)

(72) Inventors: Yan Zheng, Shanghai (CN); Zhongwei Cao, Shanghai (CN); Qiang Huang, Shanghai (CN); Rui Yang, Shanghai (CN); Sandrine Teixeira de Carvalho, Rosseignies (BE); Lujing Xie, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 541 days.

(21) Appl. No.: 17/253,744

(22) PCT Filed: Jun. 27, 2018

(86) PCT No.: PCT/CN2018/092983
§ 371 (c)(1),
(2) Date: Dec. 18, 2020

(87) PCT Pub. No.: WO2020/000228
PCT Pub. Date: Jan. 2, 2020

(65) Prior Publication Data
US 2021/0269643 A1 Sep. 2, 2021

(51) Int. Cl.
| | |
|---|---|
| *C08L 83/04* | (2006.01) |
| *H01M 10/625* | (2014.01) |
| *H01M 10/66* | (2014.01) |
| *C08K 5/00* | (2006.01) |
| *C08K 3/04* | (2006.01) |
| *C08K 3/40* | (2006.01) |
| *C08K 7/20* | (2006.01) |
| *C08K 7/18* | (2006.01) |
| *C08K 3/22* | (2006.01) |
| *C08K 3/38* | (2006.01) |
| *H01M 10/48* | (2006.01) |

(52) U.S. Cl.
CPC ............ *C08L 83/04* (2013.01); *C08K 5/005* (2013.01); *H01M 10/625* (2015.04); *H01M 10/66* (2015.04); *C08K 3/042* (2017.05); *C08K 3/40* (2013.01); *C08K 7/18* (2013.01); *C08K 2003/2227* (2013.01); *C08K 2003/385* (2013.01); *C08K 2201/001* (2013.01); *C08K 2201/005* (2013.01); *C08L 2203/20* (2013.01); *H01M 10/486* (2013.01)

(58) Field of Classification Search
None
See application file for complete search history.

(56) References Cited

U.S. PATENT DOCUMENTS

| | | | |
|---|---|---|---|
| 9,070,958 B2 | 6/2015 | Obasih et al. | |
| 9,203,064 B2 | 12/2015 | Lee et al. | |
| 9,424,977 B2 | 8/2016 | Iwata et al. | |
| 9,598,575 B2 * | 3/2017 | Bhagwagar | F28F 23/00 |
| 2008/0213578 A1 | 9/2008 | Endo et al. | |
| 2008/0254247 A1 | 10/2008 | Asaine | |
| 2010/0275440 A1 | 11/2010 | Paisner et al. | |
| 2013/0105726 A1 | 5/2013 | Tsuji et al. | |
| 2018/0312639 A1 | 11/2018 | Gammie et al. | |

FOREIGN PATENT DOCUMENTS

| | | |
|---|---|---|
| CN | 101104738 A | 1/2008 |
| CN | 101104738 A | 1/2008 |
| CN | 101284946 A | 10/2008 |
| CN | 101284946 A | 10/2008 |
| CN | 103073894 A | 5/2013 |
| CN | 103073894 A | 5/2013 |
| CN | 106398226 A | 2/2017 |
| CN | 108137810 A | 6/2018 |
| CN | 108137810 A | 6/2018 |
| EP | 0750008 A2 | 5/1996 |

(Continued)

OTHER PUBLICATIONS

International Search Report for PCT/CN2018/092983 dated Mar. 25, 2019, 4 pages.

(Continued)

*Primary Examiner* — Fred M Teskin
(74) *Attorney, Agent, or Firm* — WARNER NORCROSS + JUDD LLP

(57) ABSTRACT

A thermally conductive silicone composition is provided. The composition comprises: (A) an alkenyl group-containing organopolysiloxane; (B) an organohydrogenpolysiloxane having an average of two to four silicon-bonded hydrogen atoms in a molecule, wherein an amount of the silicon-bonded hydrogen atoms in component (B) is 0.2 to 5 moles per mole of the alkenyl groups in component (A), and at least two of the silicon-bonded hydrogen atoms are located on the side chains of the molecule; (C) a hydrosilylation reaction catalyst; (D) a thermally conductive filler; (E) an alkoxysilane having an alkyl group containing 6 or more carbon atoms in a molecule; and (F) glass beads. A thermally conductive member is produced from the thermally conductive silicone composition. An electronic device has the thermally conductive member and a manufacturing method of the electronic device includes using the thermally conductive silicone composition.

13 Claims, No Drawings

(56) References Cited

FOREIGN PATENT DOCUMENTS

| JP | H08319425 A | 12/1996 |
| JP | H08319425 A | 12/1996 |
| JP | 2009138036 A | 6/2009 |
| WO | 2018088416 A1 | 5/2018 |
| WO | 2018088417 A1 | 5/2018 |

OTHER PUBLICATIONS

Machine assisted English translation of JP2009138036A obtained from https://patents.google.com/patent/ on Dec. 17, 2020, 9 pages.
Machine assisted English translation of CN106398226A obtained from https://patents.google.com/patent/ on Dec. 17, 2020, 11 pages.
Machine assisted English translation of WO2018088416A1 obtained from https://patents.google.com/ on Apr. 12, 2022, 12 pages.
Machine assisted English translation of WO2018088417A1 obtained from https://patents.google.com/ on Apr. 12, 2022, 14 pages.

* cited by examiner

THERMAL GAP FILLER AND ITS APPLICATION FOR BATTERY MANAGEMENT SYSTEM

CROSS-REFERENCE TO RELATED APPLICATIONS

This application claims priority to and is the U.S. National Stage of International Appl. No. PCT/CN2018/092983 filed on 27 Jun. 2018, the content of which is incorporated herein by reference.

TECHNICAL FIELD

The present disclosure relates to a thermally conductive silicone composition, a thermally conductive member produced from the same. In addition, the present disclosure further relates to an electronic device having the thermally conductive member and a manufacturing method of the electronic device using the thermally conductive silicone composition.

BACKGROUND ART

In recent years, vehicles using electric power for all or a portion of their motive power (e.g, electric vehicles (EVs), hybrid electric vehicles (HEVs), plug-in hybrid electric vehicles (PHEVs), and the like, collectively referred to as "electric vehicles") are becoming increasingly popular for their advantages in energy conservation and environment protection. Nowadays, more and more electric buses are powered with rechargeable lithium-ion batteries. However, lithium-ion batteries may be more susceptible to variations in battery temperature than comparable NiMH batteries, and thus, typically a Battery Management System (BMS) is installed to manage the battery, such as protecting the battering to work within safe temperature and voltage ranges in order to operate safely and efficiently. BMS is a high voltage/power electronic system, wherein heat is accumulated at certain areas and temperature can be over 100° C. during the charge and discharge of the batteries. Such heat has to be dissipated with a cold plate throughout the device lifetime. In a BMS package, a heat-generating component such as Printed Circuit Board (PCB) is coupled to a heat sink (e.g, an aluminum cover). However, the air gaps between PCBs and heat sinks can reduce the effectiveness of heat transfer through the interfaces. Therefore, many materials and devices have been proposed for improving the effectiveness of heat transfer through the interfaces in a BMS package.

Curable silicone compositions that are cured by hydrosilylation reactions exhibit excellent heat transfer properties, heat resistance, cold resistance, and electrical insulating properties and so on, and are therefore widely used in electrical and electronic applications. Thermally conductive silicone compositions for heat transfer in electronic devices are well known in the art.

By way of example, U.S. Pat. No. 9,203,064B2 discloses a battery pack for electric vehicles and mentions using thermal dissipation members/sheets with battery cells such that heat generated is removed through thermal conduction through the heat dissipation members.

U.S. Pat. No. 9,424,977B2 describes a silicone thermally conductive adhesive for use in reactor for battery set-up converter (for EV/HEVs). The silicone composition disclosed in this patent is a system D (addition-cure) type (containing epoxy groups).

U.S. Pat. No. 9,070,958B2 discusses an EV battery system with a thermal management system, wherein one of the thermal interface materials used is an alumina or BN filled silicone polymer system.

US 20100275440A1 mentions a silicone thermal conductive gelled grease with no pump-out issue for use in chip.

However, when a material is used to fill the gaps left between PCBs and aluminum covers in BMS to facilitate the heat removal, the Bond Line Thickness (BLT) control is important. The material used should exhibit low thermal contact resistance for dissipating heat and encapsulated protection of the resistors on PCB from mechanical stress, and should have no flow-out issue but can stay in the place once dispensed even at a vertical position. In other words, the material should have slump resistance to be able to fill the thick gaps for BMS thermal management. Unfortunately, none of the existing materials has desirably fulfilled the above-mentioned requirements. Accordingly, there is a need in the art for a thermally conductive silicone composition which can be used to sufficiently improve the effectiveness of heat transfer through the interface(s) in a BMS package.

PRIOR ART DOCUMENTS

Patent Documents

Patent Document 1: U.S. Pat. No. 9,203,064B2
Patent Document 2: U.S. Pat. No. 9,424,977B2
Patent Document 3: U.S. Pat. No. 9,070,958B2
Patent Document 4: United States Patent Application No.: US 20100275440A1

SUMMARY OF INVENTION

Technical Problem

An object of the present disclosure is to provide a thermally conductive silicone composition which can be used as a thermal interface material to fill the gaps left between PCBs and heat sinks in BMS to facilitate the heat removal. The thermally conductive silicone composition should have excellent heat transfer properties, high dielectric properties, low modulus for internal stress dissipation/damping, anti-crack properties, and stable thermal-physical performance without flow-out issue. In addition, other objects of the present disclosure include providing a thermally conductive member produced by curing the thermally conductive silicone composition, providing an electronic device having the thermally conductive member, and providing a manufacturing method of an electronic device using the thermally conductive silicone composition.

Solution to Problem

The thermally conductive composition of the present disclosure comprises:
(A) 100 parts by mass of an alkenyl group-containing organopolysiloxane having a viscosity of 10 to 100000 mPa·s at 25° C.;
(B) an organohydrogenpolysiloxane having a viscosity of 1 to 1000 mPa·s at 25° C. having an average of two to four silicon-bonded hydrogen atoms in a molecule, comprised at a quantity whereby an amount of the silicon-bonded hydrogen atoms in component (B) is 0.2 to 5 moles per mole of the alkenyl groups in component (A), wherein at least two of the silicon-bonded hydrogen atoms are located in the side chains of the molecule;
(C) a catalytic quantity of a hydrosilylation reaction catalyst;
(D) 400 to 3500 parts by mass of a thermally conductive filler;
(E) an alkoxysilane having an alkyl group containing 6 or more carbon atoms in a molecule, comprised at a quantity of 0.1 to 2.0 mass % relative to component (D); and
(F) glass beads having a particle size within the range of 100 μm to 500 μm, containing less than 0.1 mass % of iron, comprised at a quantity of 0.1 to 10 parts by mass relative to 100 parts by mass of component (A).

In one or more embodiments, component (E) is an alkoxysilane represented by the general formula:

$$Y_nSi(OR)_{4-n},$$

wherein Y is an alkyl group containing 6 to 18 carbon atoms, R is an alkyl group containing 1 to 5 carbon atoms, and n is a number of 1 or 2.

In one or more embodiments, component (E) is a trialkoxysilane having an alkyl group containing 6 to 18 carbon atoms.

In one or more embodiments, component (D) has been surface-treated with component (E).

The thermally conductive silicone composition of the present disclosure may further comprise (G) a hydrosilylation reaction inhibitor.

In addition, the thermally conductive silicone composition of the present disclosure may further comprise (H) a thermal stabilizer.

In one or more embodiments, component (D) is (D1) a plate-like boron nitride powder having an average particle size of 0.1 to 30 μm; or (D2) a granular boron nitride powder having an average particle size of 0.1 to 50 μm; or (D3) a spherical and/or crushed alumina powder having an average size of 0.01 to 50 μm; or (D4) a graphite having an average particle size of 0.01 to 50 μm; or a mixture of at least two of (D1) to (D4).

In one or more embodiments, component (B) contains (B1) a straight-chain organohydrogenpolysiloxane having an average of two to three silicon-bonded hydrogen atoms in a molecule, wherein at least two of the silicon-bonded hydrogen atoms are located on the side chains of the molecule.

In one or more embodiments, the content of the silicon-bonded hydrogen atoms in component (B) is represented as $[H_B]$, and the content of the silicon-bonded hydrogen atoms in an organohydrogenpolysiloxane other than component (B) is represented as $[H_{non-B}]$, and the ratio of $[H_{non-B}]/([H_B]+[H_{non-B}])$ is within the range of 0.0 to 0.70.

The thermally conductive member of the present disclosure is produced by curing the thermally conductive silicone composition of the present disclosure.

The electronic device of the present disclosure has the thermally conductive member of the present disclosure.

The electronic device of the present disclosure may be a battery management system.

Furthermore, the manufacturing method of the electronic device of the present disclosure includes filling at least one gap in the electronic device with the thermally conductive silicone composition of the present disclosure.

Advantageous Effects of Invention

The thermally conductive silicone composition of the present disclosure shows excellent heat transfer properties, high dielectric properties, low modulus for internal stress dissipation/damping, anti-crack properties, and stable thermal-physical performance. Therefore, the thermally conductive silicone composition of the present disclosure can be used as a thermal interface material to fill the gaps left between PCBs and heat sinks in BMS to facilitate the heat removal, giving low thermal contact resistance for dissipating heat and encapsulated protection of the resistors on PCB from mechanical stress. The glass beads endow the thermal conductive silicone composition with good BLT control, enable to fill the specific gap(s) of 180 μm to 250 μm between PCB and heat sinks. In addition, the thermally conductive silicone composition of the present disclosure do not have flow out issue and can stay in place once dispensed even at a vertical position, and the nature of slump resistance make it capable of filling the thick gap(s) for BMS thermal management.

DESCRIPTION OF EMBODIMENTS

[Thermally Conductive Silicone Composition]
First, the thermally conductive silicone composition of the present disclosure will be described in detail.
The thermally conductive silicone composition of the present disclosure may comprise:
(A) 100 parts by mass of an alkenyl group-containing organopolysiloxane having a viscosity of 10 to 100000 mPa·s at 25° C.;
(B) an organohydrogenpolysiloxane having a viscosity of 1 to 1000 mPa·s at 25° C. having an average of two to four silicon-bonded hydrogen atoms in a molecule, comprised at a quantity whereby an amount of the silicon-bonded hydrogen atoms in component (B) is 0.2 to 5 moles per mole of the alkenyl groups in component (A), wherein at least two of the silicon-bonded hydrogen atoms are located on the side chains of the molecule;
(C) a catalytic quantity of a hydrosilylation reaction catalyst;
(D) 400 to 3500 parts by mass of a thermally conductive filler;
(E) an alkoxysilane having an alkyl group containing 6 or more carbon atoms in a molecule, comprised at a quantity of 0.1 to 2.0 mass % relative to component (D);
(F) glass beads having a particle size of greater than 100 μm containing less than 0.1 mass % of iron, comprised at a quantity of 0.1 to 10 parts by mass relative to 100 parts by mass of component (A);
optionally, (G) a hydrosilylation reaction inhibitor; and
optionally, (H) a thermal stabilizer.

Each of the components will be described in more detail below.

[(A) Alkenyl Group-Containing Organopolysiloxane]
Component (A) alkenyl group-containing organopolysiloxane is the polymer matrix of the thermally conductive silicone composition of the present disclosure, which has a viscosity of 10 to 100000 mPa·s at 25° C. The viscosity at 25° C. of component (A) is preferably within the range of 10 to 10000 mPa·s, and more preferably within the range of 100 to 10000 mPa·s. If the viscosity at 25° C. of component (A) is lower than 10 mPa·s, then the vertical holding stability and low modulus of the resulting composition will be impaired. On the other hand, if the viscosity at 25° C. of component (A) is higher than 100000 mPa·s, then the workability such as dispensing and assimilability will be impaired.

Component (A) may consist of one or more alkenyl group-containing organopolysiloxanes. The molecule structure of the alkenyl group-containing organopolysiloxane is not particularly limited. By way of non-limiting examples, the molecule structure may be a straight-chain structure, a branched structure, a cyclic structure, a 3D-network structure, or a combination thereof. Component (A) may consist only of a straight-chain alkenyl group-containing organopolysiloxane, or may consist only of a branched alkenyl group-containing organopolysiloxane, or may consist of a mixture of a straight-chain alkenyl group-containing organopolysiloxane and a branched alkenyl group-containing organopolysiloxane. Examples of the alkenyl groups in component (A) include vinyl groups, allyl groups, butenyl groups, and hexenyl groups or the like. Furthermore, examples of the organic groups other than the alkenyl groups in component (A) include alkyl groups such as methyl groups, ethyl groups, and propyl groups; aryl groups such as phenyl groups and tolyl groups; and halogen-substituted alkyl groups such as 3,3,3-trifluoropropyl groups.

It is particularly preferable that component (A) is a straight-chain alkenyl group-containing organopolysiloxane having alkenyl groups at least on both molecular terminals. Component (A) may also contain alkenyl groups only on both molecular terminals. Component (A) having the above-mentioned structures is not particularly limited, examples thereof include dimethylpolysiloxanes capped at both molecular terminals with dimethylvinylsiloxy groups; dimethylsiloxane-methylphenylsiloxane copolymers capped at both molecular terminals with dimethylvinylsiloxy groups; dimethylsiloxane-methylvinylsiloxane copolymers capped at both molecular terminals with trimethylsiloxy groups; dimethylsiloxane-methylvinylsiloxane-methylphenylsiloxane copolymers capped at both molecular terminals with trimethylsiloxy groups; dimethylsiloxane-methylvinylsiloxane copolymers capped at both molecular terminals with silanol groups; polymers having part of the methyl groups substituted with alkyl groups other than methyl groups such as ethyl groups and propyl groups or with halogen-substituted alkyl groups such as 3,3,3-trifluoropropyl groups; polymers obtained by substituting the vinyl groups in the above-mentioned polymers with alkenyl groups other than vinyl groups such as allyl groups, butenyl groups, and hexenyl groups; and a mixture of two or more the above-mentioned polymers.

Furthermore, component (A) may have an alkoxysilyl-containing group represented by the general formula:

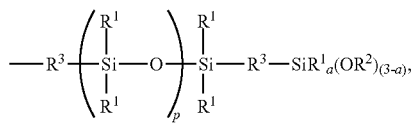

wherein $R^1$ is identical or different monovalent hydrocarbon groups free of aliphatic unsaturated bond; $R^2$ is an alkyl group; $R^3$ is identical or different alkylene groups; a is an integer of 0 to 2; and p is an integer of 1 to 50. The organopolysiloxane containing these functional groups can suppress the thickening of the composition in its uncured state, and can also function as a surface treatment agent for component (D) because of the existence of the alkoxysilyl groups in the molecule. Therefore, the thickening and oil bleeding of the resulting composition can be suppressed, and the advantage that the workability is not impaired can be obtained.

[(B) Organohydrogenpolysiloxane]

Component (B) can be a straight-chain organohydrogenpolysiloxane having a viscosity of 1 to 1000 mPa·s at 25° C. having an average of two to four silicon-bonded hydrogen atoms in a molecule, wherein at least two of the silicon-bonded hydrogen atoms are located on the side chains of the molecule. Having the above-mentioned structures means that in the present composition, component (B) functions as a chain extender for the hydrosilylation reaction of the silicon-bonded hydrogen atoms on the side chains.

In the thermally conductive silicone composition of the present disclosure, component (B) functions as a chain extender for component (A), mildly crosslinking the entire composition to form a gel-like cured product. Since component (B) has an average of at least two silicon-bonded hydrogen atoms on the side chains of the molecular and has only an average of two to four silicon-bonded hydrogen atoms in the molecular, the crosslinking extension reaction is proceeded primarily by the two to four silicon-bonded hydrogen atoms on the side chains, thereby a thermally conductive silicone gel cured product with excellent peelability from a member and excellent reparability such as repair/reuse can be formed.

From the viewpoint of improving the peelability and reparability, it is preferable that component (B) is (B1) a straight-chain organohydrogenpolysiloxane having an average of two to three silicon-bonded hydrogen atoms in a molecule, wherein at least two of the silicon-bonded hydrogen atoms are located on the side chains of the molecule. It is particularly preferable that component (B) is (B1-1) an organohydrogenpolysiloxane having an average of two to three silicon-bonded hydrogen atoms only on the side chains of the molecule. Moreover, it is mostly preferable that component (B) has only two silicon-bonded hydrogen atoms only on the side chains of the molecule.

In the composition of the present disclosure, component (B) should be comprised at a quantity whereby an amount of the silicon-bonded hydrogen atoms in component (B) is 0.2 to 5 moles per mole of the alkenyl groups in component (A). From the viewpoint of the formation and the peelability from cured products as well as the reparability of the resulting thermally conductive silicone cured product, it is particularly preferable that component (B) is comprised at a quantity whereby an amount of the silicon-bonded hydrogen atoms in component (B) is 0.3 to 2.0 moles or 0.4 to 1.0 mole or 0.4 to 0.8 mole per mole of the alkenyl groups in component (A). Specifically, when an organohydrogenpolysiloxane other than component (B) is not present in the composition, if the content of the silicon-bonded hydrogen atoms in component (B) is less than the lower limit, the curing of the thermally conductive silicone composition may be poor. On the other hand, if the content is greater than the upper limit, the amount of the silicon-bonded hydrogen atoms will become excessive, impairing the peelability from cured products as well as the reparability.

Examples of component (B) include methylhydrogensiloxane-dimethylsiloxane copolymers capped at both molecular terminals with trimethylsiloxy groups, methylhydrogensiloxane-dimethylsiloxane copolymers capped at both molecular chain terminals with dimethylhydrogensiloxy group, wherein part of the methyl groups can be substituted with phenyl groups, hydroxyl groups, and alkoxy groups or the like.

The viscosity at 25° C. of component (B) is preferably within the range of 1 to 1000 mPa·s, and more preferably within the range of 1 to 500 mPa·s.

[Combination with Other Cross-Linking Agents]

The composition of the present disclosure may comprise an organohydrogenpolysiloxane other than component (B). Examples of the organohydrogenpolysiloxane that can be used as a cross-linking agent other than component (B) include methylhydrogensiloxane-dimethylsiloxane copolymers having an average of more than four silicon-bonded hydrogen atoms in the molecule capped at both molecular terminals with trimethylsiloxy groups; methylhydrogensiloxane-dimethylsiloxane copolymers having an average of more than four silicon-bonded hydrogen atoms in the molecule capped at both molecular terminals with dimethylhydrogensiloxy groups; methylhydrogenpolysiloxanes capped at both molecular terminals with trimethylsiloxy groups; dimethylpolysiloxanes capped at both molecular terminals with dimethylhydrogensiloxy groups; and methylhydrogensiloxy group-containing siloxane resins or the like. However, component (B) should be comprised in the composition in the above-mentioned amount as a cross-linking agent. Even when another organohydrogenpolysiloxane is used in combination with component (B), it is preferable that the proportion of component (B) in the composition is greater than a certain value from the viewpoint of the curing properties and the peelability from cured products as well as the reparability of the composition of the present disclosure. Furthermore, it is preferable that the organohydrogenpolysiloxanes have an average of at most eight silicon-bonded hydrogen atoms per molecule.

More specifically, when the content of the silicon-bonded hydrogen atoms in component (B) is represented as $[H_B]$, and the content of the silicon-bonded hydrogen atoms in an organohydrogenpolysiloxane other than component (B) is represented as $[H_{non-B}]$, the ratio of $[H_{non-B}]/([H_B]+[H_{non-B}])$ is preferable within the range of 0.0 to 0.70. The ratio of $[H_{non-B}]/([H_B]+[H_{non-B}])$ may also within the range of 0.0 to 0.50, or 0.0 to 0.25, or becomes 0.0. If the ratio of $[H_{non-B}]/([H_B]+[H_{non-B}])$ is greater than the upper limit, the contribution of component (B) to the whole composition will weaken, the peelability from cured products and the reparability can be impaired, and the curing can become poor.

From the viewpoint of the technical effect of the present disclosure, it is suitable to use organohydrogenpolysiloxanes in the following combinations as the cross-linking agent in the present composition.

(B'1) Component (B) is used alone, which means that no other organohydrogenpolysiloxane will be blended on purpose, and component (B) is essentially used alone.

(B'2) A mixture of organohydrogenpolysiloxanes is used, which means in addition to component (B), one or more than two of dimethylpolysiloxanes capped at both molecular terminals with dimethylhydrogensiloxy groups, methylhydrogensiloxane-dimethylsiloxane copolymers having an average of 5 to 8 silicon-bonded hydrogen atoms in the molecule capped at both molecular terminals with trimethylsiloxy groups, and methylhydrogensiloxane-dimethylsiloxane copolymers having an average of 5 to 8 silicon-bonded hydrogen atoms in the molecule capped at both molecular terminals with dimethylhydrogensiloxy groups are incorporated.

However, even when (B'2) is used, it is preferable that the value of the ratio of $[H_{non-B}]/([H_B]+[H_{non-B}])$ is within the ranges above-mentioned.

[Content of Organohydrogenpolysiloxane (the Cross-Linking Agent) in the Composition]

In the composition comprising component (B), component (B) is comprised at a quantity whereby an amount of the silicon-bonded hydrogen atoms in organohydrogenpolysiloxane is 0.2 to 5 moles per mole of the alkenyl groups in component (A). Furthermore, from the viewpoint of the formation and the peelability from cured products as well as the reparability of the resulting thermally conductive silicone cured product, it is particularly preferable that component (B) is comprised at a quantity whereby an amount of the silicon-bonded hydrogen atoms in organohydrogenpolysiloxane is 0.3 to 2.0 moles or 0.4 to 1.0 mole or 0.4 to 0.8 moles per mole of the alkenyl groups in component (A).

Typically, when the organohydrogenpolysiloxane is one of the mixtures shown above, in particular the mixture of component (B) and dimethylpolysiloxanes capped at both molecular terminals with dimethylhydrogensiloxy groups, from the viewpoint of improving the curing properties of the composition, the amount of the silicon-bonded hydrogen atoms in organohydrogenpolysiloxane is preferably 0.5 to 1.5 moles, and more preferably 0.7 to 1.0 moles per mole of the alkenyl groups in component (A). On the other hand, when the component (B) is essentially the only organohydrogenpolysiloxane in the composition, the amount of the silicon-bonded hydrogen atoms in organohydrogenpolysiloxane is preferably 0.3 to 1.5 moles, and more preferably 0.4 to 1.0 moles per mole of the alkenyl groups in component (A). Further, when the type and the content of the organohydrogenpolysiloxane in the composition are within the ranges above-mentioned, the technical effects of the present disclosure, which include the optimal fluidity and gap filling property of the thermally conductive silicone composition as well as the optimal physical properties (especially the peelability and reparability) of the resulting thermally conductive silicone cured products, can be obtained.

[(C) Hydrosilylation Reaction Catalyst]

Examples of hydrosilylation reaction catalyst include platinum-based catalysts, rhodium-based catalysts and palladium-based catalysts. Component (C) is preferably a platinum-based catalyst so that the curing of the present composition can be dramatically accelerated. Examples of the platinum-based catalyst include a platinum fine powder, chloroplatinic acid, an alcohol solution of chloroplatinic acid, a platinum-alkenylsiloxane complex, a platinum-olefin complex, platinum-carbonyl complex, and catalysts obtained by dispersing or encapsulating the above-mentioned platinum-based catalysts in thermoplastic resins such as silicone resins, polycarbonate resins, and acrylic resins or the like. It is particularly preferable that component (C) is a platinum-alkenylsiloxane complex. Examples of the alkenylsiloxane include 1,3-divinyl-1,1,3,3-tetramethyldisiloxane, 1,3,5,7-tetramethyl-1,3,5,7-tetravinylcyclotetrasiloxane, alkenylsiloxanes having part of the methyl groups substituted by ethyl groups, phenyl groups or the like. In addition, component (C) is preferably 1,3-divinyl-1,1,3,3-tetramethyldisiloxane because of the good stability of the platinum-alkenylsiloxane complex. Furthermore, from the viewpoint of improving the workability and the pot life of the composition, hydrosilylation reaction catalysts having fine-powdery platinum dispersed or encapsulated in thermoplastic resins can also be used. Moreover, as a catalyst capable of facilitating hydrosilylation reaction, non-platinum-based catalysts such as iron, ruthenium, and iron/cobalt can also be used.

The hydrosilylation reaction catalyst can be added in a catalytic quantity. The content of the hydrosilylation reaction catalyst is not particularly limited as long as there is a quantity sufficient to promote the curing of the present composition. However, relative to component (A), it is preferable that the hydrosilylation reaction catalyst is comprised at a quantity whereby the amount of the metal atoms is by mass within the range of 0.01 to 500 ppm, 0.01 to 100 ppm or 0.01 to 50 ppm.

[(D) Thermally Conductive Filler]

Component (D) is a thermally conductive filler capable of providing the present composition and the thermally conductive member cured from the composition with thermal conductivity. Examples of component (D) can be selected from the group consisting of pure metals, alloys, metal oxides, metal hydroxides, metal nitrides, metal carbides, metal silicides, carbon, soft magnetic alloys, and ferrites. Component (D) is preferably at least one powder and/or fiber, wherein metal powders, metal oxide powders, metal nitride powders or carbon powders are suitable.

In addition, it is preferable that the whole or part of the thermally conductive filler has been surface-treated with component (E) which is an alkoxysilane and will be described in more detail below. Moreover, the powders and/or fibers that have been surface-treated with various surface treatment agents known as coupling agents can be used in addition to or together with component (E). In addition to component (E), examples of the surface treatment agents used for treating the powders and/or fibers of component (D) include surfactants, other silane-based coupling agents, aluminum-based coupling agents, and silicone-based surface treatment agents.

Examples of the pure metal include bismuth, lead, tin, antimony, indium, cadmium, zinc, silver, copper, nickel, aluminum, iron, and metallic silicon. Examples of the alloy include the alloys consisting of two or more metals selected from the group consisting of bismuth, lead, tin, antimony, indium, cadmium, zinc, silver, aluminum, iron, and metallic silicon. Examples of the metal oxide include alumina, zinc oxide, silica, magnesium oxide, beryllium oxide, chromium oxide, and titanium oxide. Examples of the metal hydroxide include magnesium hydroxide, aluminum hydroxide, barium hydroxide, and calcium hydroxide. Examples of the metal nitride include boron nitride, aluminum nitride, and silicon nitride. Examples of the metal carbide include silicon carbide, boron carbide and titanium carbide. Examples of the metal silicide include magnesium silicide, titanium silicide, zirconium silicide, tantalum silicide, niobium silicide, chromium silicide, tungsten silicide, and molybdenum silicide. Examples of carbon include diamond, graphite, fullerene, carbon nanotube, graphene, activated carbon, and amorphous carbon black. Examples of the soft magnetic alloy include a Fe—Si alloy, a Fe—Al alloy, a Fe—Si—Al alloy, a Fe—Si—Cr alloy, a Fe—Ni alloy, a Fe—Ni—Co alloy, a Fe—Ni—Mo alloy, a Fe—Co alloy, a Fe—Si—Al—Cr alloy, a Fe—Si—B alloy and a Fe—Si—Co—B alloy. Examples of ferrite included but not limited to Mn—Zn ferrite, Mn—Mg—Zn ferrite, Mg—Cu—Zn ferrite, Ni—Zn ferrite, Ni—Cu—Zn ferrite and Cu—Zn ferrite.

In addition, component (D) is preferably silver powders, aluminum powders, aluminum oxide powders, zinc oxide powders, aluminum nitride powders or graphite. Further, in the case that the electrical insulation is required for the present composition, component (D) is preferably a metal oxide powder or a metal nitride powder, especially an aluminum oxide powder, a zinc oxide powder, and an aluminum nitride powder.

The shape of component (D) is not particularly limited, examples of the shape of component (D) include a spherical shape, a needle shape, a disc shape, a rod shape, and an indefinite shape, wherein the spherical shape and the indefinite shape are preferable. Further, the average diameter of component (D) is not particularly limited, but the range of 0.01 to 100 µm is preferable, the range of 0.01 to 50 µm is more preferable, and the range of 0.1 to 40 µm is most preferable.

It is particularly preferable that component (D) is (D1) a plate-like boron nitride powder having an average particle size of 0.1 to 30 µm; or (D2) a granular boron nitride powder having an average particle size of 0.1 to 50 µm; or (D3) a spherical and/or crushed alumina powder having an average size of 0.01 to 50 µm; or (D4) a graphite having an average particle size of 0.01 to 50 µm; or a mixture of at least two of (D1) to (D4). Component (D) is most preferably a mixture of two or more spherical and crushed alumina powders having an average size of 0.01 to 50 µm. Specifically, the filling efficiency can be improved and the low viscosity and high thermal conductivity can be achieved by combining the aluminum oxide powders having large diameters with the aluminum oxide powders having small diameters on the ratio in accordance with the theoretical distribution cure for densest-filling.

Relative to 100 parts by mass of component (A), the content of component (D) is within the range of 400 to 3500 pars by mass, and is preferably within the range of 400 to 3000 parts by mass. If the content of component (D) is less than the lower limit, the thermal conductivity of the resulting composition is insufficient. On the other hand, if the content of component (D) is greater than the upper limit, the viscosity of the resulting composition will increase and the workability and the gap filling ability of the composition can be deteriorated, even when component (E) is blended or component (D) has been surface treated.

Furthermore, in order to provide the present composition and the thermally conductive member cured from the composition with sufficient thermal conductivity, the thermal conductivity of component (D) is preferably at least 10 W/m·K, more preferably at least 20 W/m·K, and most preferably at least 50 W/m·K.

[(E) Alkoxysilane]

Component (E) can be an alkoxysilane having an alkyl group containing 6 or more carbon atoms in a molecule. Examples of the alkyl groups containing 6 or more carbon atoms include alky groups such as hexyl groups, octyl groups, dodecyl groups, tetradecyl groups, hexadecyl groups, and octadecyl groups; aralkyl groups such as benzyl groups and phenylethyl groups. The alkyl groups containing 6 to 20 carbon atoms are particularly preferable. If an alkoxysilane having an alkyl group containing less than 6 carbon atoms is used, the effect of reducing the viscosity of the composition may be insufficient, thereby the viscosity of the composition will increase, and the desired fluidity and gap filling property cannot be achieved. In addition, if an alkoxysilane having an alky group containing more than 20 carbon atoms is used, the industrial availability can become a problem, and the intermiscibility with particular types of component (A) can be poor.

Preferably, component (E) is an alkoxysilane which can be represented by the general formula:

$$Y_n Si(OR)_{4-n},$$

wherein, Y is an alkyl group containing 6 to 18 carbon atoms, R is an alkyl group containing 1 to 5 carbon atoms, and n is a number of 1 or 2. Examples of the OR group include methoxy groups, ethoxy groups, propoxy groups, and butoxy groups, wherein methoxy groups and ethoxy groups are particularly preferable. In addition, n is 1, 2 or 3, wherein 1 is preferable.

In particular, examples of component (E) include $C_6H_{13}Si(OCH_3)_3$, $C_8H_{17}Si(OCH_3)_3$, $C_8H_{17}Si(OC_2H_5)_3$, $C_{10}H_{21}Si$ (OCH$_3$)$_3$, C$_{11}$H$_{23}$Si(OCH$_3$)$_3$, C$_{12}$H$_{25}$Si(OCH$_3$)$_3$, and C$_{14}$H$_{29}$Si(OC$_2$H$_5$)$_3$, wherein n-decyltrimethoxysilane and n-octyltrimethoxysilane are most suitable.

The content of component (E) is 0.1 to 2.0 mass %, and preferably 0.2 to 1 mass % relative to component (D). If the content of component (E) is less than the lower limit, the effect of reducing the viscosity of the composition may be insufficient. On the other hand, if the content of component (E) is greater than the higher limit, the viscosity cannot be further reduced, and the alkoxysilane may decompose, and the preservation stability can deteriorate.

In the present disclosure, it is preferable that component (D) has been surface treated by component (E). In addition, from the viewpoint of improving the fluidity and gap filling property of the present composition, it is particularly preferable that at least part of component (D) has been surface treated by component (E). Where component (E) is used as a surface treatment agent, relative to component (D), the content of component (E) is preferably within the range of 0.15 to 1.2 mass %, and more preferably within the range of 0.2 to 1.0 mass %.

The surface treatment method using component (E) is not particularly limited, examples thereof include a direct treatment to the thermally conductive inorganic filler of component (D), an integral blending method, and a dry concentrate method. The direct treatment method includes but not limited to a dry method, a slurry method, and a spray method or the like, and the integral blending method includes but not limited to a direct method and a master batch method, wherein the dry method, the slurry method, and the direct method are usually employed. Preferably, all of components (D) and (E) have been mixed with a known mixing device before the mixture is used to treat the surface. In addition, part of component (E) can hydrolyze or form a polymer on the surface of component (D).

The mixing device is not particularly limited, examples thereof include an uniaxial or biaxial continuous mixer, a twin roller, a Ross mixer, a Hobart mixer, a Dental mixer, a planetary mixer, a kneader mixer, and a Henschel mixer or the like.

[(F) Glass Beads]

The glass beads of component (F) are added for Bond Line Thickness (BLT) control. The particle size (usually expressed as D50, which refers to the particle size when the cumulative size distribution percentage of a sample reaches 50%) of the glass beads is within the range of 100 μm to 500 μm, more preferably within the range of 150 μm to 450 μm, and most preferably within the range of 170 μm to 300 μm. If the particle size of the glass beads is less than the lower limit, the effect of BLT control can be insufficient. On the other hand, if the particle size of the glass beads is greater than the upper limit, the workability and the gap filling ability of the composition can be deteriorated. In addition, the iron content of the glass beads is less than 0.1 mass %, and it is preferable that the glass beads of component (F) is substantially free of iron for electronic insulation.

The content of component (F) in the thermally conductive silicone composition of the present disclosure is 0.1 to 10 parts by mass, and preferably 0.3 to 8 parts by mass relative to 100 parts by mass of component (A). If the content of component (F) is less than the lower limit, the effect of BLT control can be insufficient. On the other hand, if the content of component (F) is greater than the upper limit, the workability and the gap filling ability of the composition can be deteriorated.

[(G) Hydrosilylation Reaction Inhibitor]

From the viewpoint of the workability, the composition of the present disclosure may further comprise (G) a hydrosilylation reaction inhibitor. A hydrosilylation reaction inhibitor is a component capable of suppressing the hydrosilylation reaction of the composition of the present disclosure. Examples of the reaction inhibitor include acetylene-based inhibitors such as ethynylcyclohexanol, amine-based inhibitors, carboxylic ester-based inhibitors, and phosphate-based inhibitors. The content of the hydrosilylation reaction inhibitor is not particularly limited as long as the effect of the present disclosure is not impaired. Typically, the content of the hydrosilylation reaction inhibitor is 0.001 to 5 mass % of the total mass of the silicone composition. Specifically, in order to improve the workability of the silicone composition, acetylene compounds such as 3-methyl-1-butyne-3-ol, 3,5-dimethyl-1-hexyne-3-ol and 3-phenyl-1-butyn-3-ol; enyne compounds such as 3-methyl-3-penten-1-yne and 3,5-dimethyl-3-hexen-1-yne; cycloalkenylsiloxanes such as 1,3,5,7-tetramethyl-1,3,5,7-tetravinylcyclotetrasiloxane, 1,3,5,7-tetramethyl-1,3,5,7-terahexenylcyclotetrasiloxane; and triazole compounds such as benzotriazole or the like can be used without particular limitation.

[(H) Thermal Stabilizer]

In addition to components (A) to (F), and other optional coupling agents and hydrosilylation reaction inhibitors, from the viewpoint of improving the heat resistance of the thermally conductive composition and the cured product thereof, the composition preferably further comprises (H) a thermal stabilizer. The thermal stabilizer is not particularly limited as long as it is capable of providing the composition and the cured product thereof with heat resistance. Examples of the thermal stabilizer include metal oxides such as iron oxide, titanium oxide, cerium oxide, magnesium oxide, alumina and zinc oxide; metal hydroxides such as cerium hydroxide; phthalocyanine compounds; carbon black; cerium silanolate; cerium fatty acid salt; and a reaction product of an organopolysiloxane with a carboxylate of cerium. Among the exampled compounds, phthalocyanine compounds are most preferable. For instance, it is preferable to use the additives selected from the group consisting of the non-phthalocyanine compounds and the metal-containing phthalocyanine compounds disclosed in Japanese Patent Application Publication No. 2014-503680. Among the disclosed metal-containing phthalocyanine compounds, phthalocyanine Copper compounds are particularly preferable. One example of the most suitable non-limiting thermal stabilizers is 29H,31H-phthalocyaninato(2-)-N29,N30,N31,N32 Copper. Such thermal stabilizers are available from for example PolyOne Corporation (Avon Lake, Ohio, U.S.A.) under the trade mark of 40SP03.

The content of component (H) is not particularly limited, but can be within the range of 0.01 to 5.0 mass % or 0.05 to 0.2 mass % or 0.07 to 0.1 mass % of the total composition.

[Other Additives]

In addition to the above-mentioned components, the present composition can further comprise any additional components as long as the effects of the present disclosure are not impaired. Examples of the additional components include inorganic fillers such as fumed silica, wet silica, pulverized quartz, titanium oxide, magnesium carbonate, zinc oxide, iron oxide, diatomaceous earth, and carbon black; inorganic fillers obtained by subjecting the surface of the above-mentioned inorganic fillers to a hydrophobic treatment with an organosilicon compound; organopolysiloxanes free of silicon-bonded hydrogen atoms and silicon-bonded alkenyl groups; a cold resistance imparting agent; a flame retardant, a thixotropy imparting agent, a pigment, and a dye or the like. In addition, if desired, the thermally conductive composition of the present disclosure may comprise a known adhesion promoter; one or more antistatic agents selected from the group consisting of anionic surfactants, cationic surfactants, and non-ionic surfactants; a dielectric filler; an electrically conductive filler; a release component; a thixotropy imparting agent; a rust inhibitor. Further, if desired, an organic solvent may be employed.

[Production Method of the Composition]

The thermally conductive composition of the present disclosure can be produced by mixing the above-mentioned components. For example, the present composition can be prepared by mixing component (D) with component (E) to treat the surface of component (D) with component (E), followed by adding components (A), (B), (C), (F), (G), (H), and other optional components for mixing. In addition, the present composition can also be prepared by mixing component (D) with component (E) in component (A) firstly, followed by heating at 100° C.-150° C. with full vacuum for filler surface treatment, the cooling to <40° C., adding components (B), (C), (F), (G), (H), and other optional components and mixing uniformly. The mixing method for each component can be conventionally known methods and is not particularly limited. Typically, since a homogeneous mixture can be obtained by merely stirring, it is preferable to conduct a mixing by employing a mixing device. Such a mixing device is not particularly limited, and examples thereof include a uniaxial or biaxial continuous mixer, a twin roller, a Ross mixer, a Hobart mixer, a Dental mixer, a planetary mixer, a kneader mixer, and a Henschel mixer or the like.

Optionally, the present composition can also comprise component (I) a siloxane having at least one alkoxy group, and component (J) an adhesion promoter component (including, but not limited to, silane compound having epoxy groups). Such a thermally conductive composition can be obtained by mixing the above-mentioned components. The overall process of the above composition can be a cold blending without cooling and heating processes. All components except for component (C) can be generally mixed before adding component (C) to prevent undesired reactions during mixing. In some embodiments, components (A), (E) and/or (I), (B), (D), (J), (F), (H) and (G) can be mixed at one time, or some components can be added after mixing other components. For example, components (A), (E) and/or (I), (D) can be mixed firstly, then components (B), (J), (F), (H), and (G) can be added and mixed. By adding components (B), (J), (F), (H) and (G) after (A), (E) and/or (I), (D), filler surface adsorbs components (A) and (E) and/or (I), and components (B), (J), (F), (H), (G) are not adsorbed by filler surfaces. Finally, component (C) is added to the mixture and mixed as well like the previous process. In another example, firstly components (A), (E) and/or (I), (B), (D) are homogeneously mixed. Next, components (J), (F), (H), (G) are added to the mixture and then mixed for 20 min. Finally, component (C) is added to the mixture and mixed as well like the previous process. The mixing time is preferably more than 5 minutes for homogeneous mixing, and is preferably less than 24 hours to prevent unexpected reactions such as thermal oxidation. To produce efficiently, the mixing time is more preferably from 5 minutes to 12 hours. For the compositions containing alumina filler, standard planetary mixers such as Ross mixers could be required for homogeneous mixing. In any production process, the timing of adding component (F) is optional. Furthermore, any of the above-mentioned production processes can be applied to any thermally conductive composition optionally comprising component (F) to improve its stability and performance.

[Composition's Form and Package]

The thermally conductive silicone composition of the present disclosure may be used as a one-component type (including one-pack type) composition. If necessary, the composition may also be used as a mixed multi-component type (including multi-pack type, especially two-pack type) composition where separated multiple components are used. Where a one-component type composition is used, each component of the composition can be added in a container and used. Where a multi-component type composition is used, multiple components kept in respective containers are mixed at a pre-determined ratio before being used. In addition, these packages can be selected as desired in accordance with the curing methods or coating means, the application targets described below, and are not particularly limited.

[Thermally Conductive Silicone Composition]

The thermally conductive silicone composition of the present disclosure is excellent in fluidity, gap filling properties, and BLT control, and can be coated precisely. Specifically, the viscosity at 25° C. of the composition before curing is in the range of 10 to 500 Pa·s, and is preferably in the range of 50 to 400 Pa·s.

The thermally conductive silicone composition of the present disclosure can be cured by a hydrosilylation reaction to form a cured silicone product (e.g., a thermally conductive member) which is excellent in thermal conductivity and bond line thickness control. The temperature condition for curing such a hydrosilylation reaction-curable silicone composition is not particularly limited, and is typically within the range of 20 to 150° C., preferably within the range of 20 to 80° C.

The hardness of the silicone composition of the present disclosure is preferably within the range of 2 to 70, and is more preferably within the range of 35 to 65, measured by Shore OO method. A silicone composition having a hardness of 70 has a hardness of 50 and less when measured by a type-A durometer which is usually used for elastomer applications. A silicone composition having a hardness within the above-mentioned ranges will have the characteristics of silicone such as low elastic modulus and low stress. On the other hand, in the case that the hardness is greater than 70, it is possible that the sacking property of the heat-generating member deteriorates though it may have good sealing performance, and in the case that the hardness is less than 2, it is possible that the stationarity of the heat-generating member deteriorates though it may have good tracking property.

[Thermal Conductivity]

The thermally conductive silicone composition of the present disclosure is capable of stably filling a thermally conductive filler, and can be used to design a composition and a cured silicone product having a thermal conductivity of 1.5 W/mK and above, preferably 3.0 W/mK and above, and more preferably within the range of 3.0 to 7.0 W/mK.

[Use and Heat Releasing Structure]

Since the thermally conductive silicone composition of the present disclosure is able to cool the heat-generating member through heat conduction, it can be used as a thermally conductive material (e.g., a thermally conductive member) disposed between the thermal interface of a heat-generating member and the interface of a heat releasing member on a heat sink or a circuit board in a BMS package, and is capable of forming a heat releasing structure equipped with the above-mentioned thermally conductive material. Although the type, the size, and the detailed configuration of the heat-generating member are not particularly limited, since the thermally conductive silicone composition of the present disclosure has high thermal conductivity, excellent gap filling property for the member, good sealing and tracking performance for the heat-generating members having tiny concave-convex textures or narrow gaps, and flexibility peculiar to a gel, the composition is suitable to be used in electric/electronic devices or electric/electronic devices having cell-type secondary batteries, such as a battery management system.

The electric/electronic devices equipped with the member consisting of the above-mentioned thermally conductive silicone composition are not particularly limited. Examples of the electric/electronic devices include battery management systems installed to manage the batteries; secondary batteries such as cell-type lithium ion electrode secondary batteries, and cell stack-type fuel cells; electronic circuit boards such as printed circuit boards; IC (integrated circuit) chips packaged with optical semiconductor elements such as light-emitting diodes (LEDs), organic electric field elements (organic ELs), laser diodes, and LED arrays; CPUs used in personal computers, digital video disks, mobile phones, and smartphones; LSI (large scale integrated circuit) chips such as driver IC or memories. Especially in high performance digital switching circuits formed with high integration density, since the performance and the reliability of the integrated circuits are primarily determined by the ability of heat dissipating (heat releasing), even the thermally conductive member formed with the thermally conductive silicone composition of the present disclosure is used in power semiconductor applications such as an engine management in a transport device or a power train management, and an air conditioner management, the member is excellent in exothermicity and workability. In addition, even the thermally conductive member formed from the thermally conductive silicone composition of the present disclosure is incorporated in a vehicle-mounted electronic device such as BMS, an electronic control unit (ECU) and used under severe environment, excellent heat resistance, thermal conductivity, and BLT control in BMS can also be achieved. Further, by controlling the rheology, the thermally conductive silicone composition of the present disclosure can be disposed not only on a horizontal plane but also on a vertical plane, and is capable of permeating into the tiny structures of the heat-generating members such as electric/electronic members and secondary batteries to provide a heat releasing structure which is free of gaps. Therefore, the exothermicity of the electric/electronic devices equipped with such heat releasing structures can be improved, and the issues regarding latent heat and thermal runaway can be alleviated. Furthermore, part of the electric/electronic devices can be protected by the flexible cured products, and the reliability and operation stability can be improved.

Examples of the materials used for manufacturing the above-mentioned electric/electronic devices include resins, ceramics, glasses, and metals such as aluminum. The thermally conductive silicone composition of the present disclosure can be applied to these substrates either as a thermally conductive silicone composition (a fluid) prior to curing, or as a thermally conductive silicone cured product.

With respect to the heat-generating members, methods of forming the heat releasing structures using the thermally conductive silicone composition of the present disclosure are not particularly limited. For example, the thermally conductive silicone composition of the present disclosure can be injected into the heat releasing portions of the electric/electronic members to fill the gaps sufficiently, and then the members are heated and allowed to stand under room temperature to cure the composition. This method is preferable when rapid curing is desired, since it can cure the whole body in a relatively rapid manner. In this case, because as the heating temperature builds up, the air bubbles or the cracks within the sealed or filled sealants for the electric/electronic members are promoted, the heating temperature is preferably within the range of 50 to 250° C., especially within the range of 70 to 130° C. In addition, in the case of heat curing, the present composition can be in the form of one-pack type package, and from the viewpoint of improving the workability and the pot life of the composition, it is more preferable to employ a particulate platinum-containing hydrosilylation reaction catalyst in which the platinum is dispersed or encapsulated with a thermoplastic resin. On the other hand, the thermally conductive silicone composition can be cured by heating at room temperature or a temperature below 50° C. In this case, the composition may be a package in the form of one-pack type or multi-pack type, and allowed to cure under room temperature or a temperature below 50° C. after mixing.

In addition, the shape, thickness, and configuration or the like of the thermally conductive silicone product obtained by the above-mentioned methods can be designed as desired. The composition can be cured after filling the gaps in the electric/electronic devices as desired, or can be applied or cured onto a film provided with a separator, and handled separately as a thermally conductive silicone product on the film. Moreover, in this case, the thermally conductive silicone product can be in the form of a thermally conductive sheet reinforced by a known reinforcing material.

[Examples of Electric/Electronic Device]

Since the thermally conductive silicone composition of the present disclosure produces a thermally conductive member excellent in gap filling property, flexibility, thermal conductivity, and BLT control, it can be used in an electric/electronic member having narrow gaps between its electrodes, narrow gaps between its electronic components, and narrow gaps between its electronic components and packages, or in the members having structures which hardly follow the expansion and contraction of the silicon products. For instance, the thermally conductive silicone composition of the present disclosure can be used in semiconductors such as secondary batteries, ICs, hybrid ICs, and LSIs; electric circuits or modules mounted with electric elements such as these semiconductors, condensers, and electric resistances; various sensors such as pressure sensors; power devices such as igniters or regulators for vehicles, power generation systems or space transportation systems. Further, the thermally conductive silicone composition of the present disclosure can be used as a thermal interface material to fill the gap left between PCB and heat sink in BMS to facilitate the heat removal with excellent BLT control.

[Manufacturing Method of the Electronic Device]

The electronic device of the present disclosure can be manufactured by filling at least one gap in the electronic device with the thermally conductive silicone composition of the present disclosure, wherein the at least one gap may be the gap left between a heat-generating member and a heating dissipating member. For example, in the case that the electronic device is a battery management system, it can be manufacturing by dispensing the thermally conductive silicone composition onto an aluminum cover (i.e., a heat sink), followed by assembling it to fill the gaps of the resistors on PCB. In this case, the BLT may be 0.1-2 mm, and low thermal contact resistance for dissipating heat and encapsulated protection of the resistors on PCB from mechanical stress are achieved.

EXAMPLES

The present disclosure will be further clarified by the following examples, which are exemplary only and do not limit the scope of the present disclosure.

The thermally conductive silicone compositions of practical examples 1 to 2 and comparative examples 1 to 2 were obtained by mixing components listed in the following tables 1 and 2 in the following manners. Specifically, components (A), (D) and (E) was mixed at the ratios shown in tables 1 and 2 (practical examples 1 and 2 and comparative examples 1 and 2) at 120° C. for 1 hour with full vacuum using a Turello mixer. The mixtures were cooled to room temperature. Other components shown in the tables were then added into the mixtures and blended uniformly.

[Preparation of the Thermally Conductive Silicone Cured Products]

The thermally conductive silicone cured products were prepared as follows: a frame having a height of 12 mm, a length of 50 mm, and a width of 30 mm was prepared on a polypropylene sheet using a polyethylene backer; the resulting composition was filled into the frame, and a sheet made of Teflon™ was Dressed onto the resulting composition to form a smooth surface, followed by curing at 25° C. for 1 day. After the curing, the sheet made of Teflon™ and the polyethylene backer were removed.

The thermally conductive silicone compositions prepared according to the contents shown in practical examples 1 and 2 and comparative examples 1 and 2 were blended with component (D) to achieve a thermal conductivity of 2.0 W/mK, respectively. The thermal conductivity was measured by Hot Disk method.

The tests showing the effects of the present disclosure were conducted as follows, and the results were shown in tables 1 and 2.

[Hardness]

The hardness of the specimens was measured using a durometer (Shore OO method).

[Compressive Deformation]

The compressive deformation rates of the specimens were measured using a texture analyzer (TA. XT. plus, manufactured by Stable Micro System) as follows. The specimens were subjected to a stress of 10 N at a speed of 0.5 mm/sec and held for 10 seconds, and the deformation ratios with respect to a specimen thickness of 12 mm when the stress reached 10 N were recorded. A probe having a diameter of 1.27 cm was employed, and the starting position of the tests was 20 mm. The cured silicone products having a height of 12 mm, a length of 50 mm, and a width of 30 mm were mounted on a base and used.

[Tensile Deformation]

The tensile deformation rates of the specimens were measured using the above-mentioned texture analyzer as follows. The specimens were subjected to a stress of 10 N at a speed of 0.5 mm/sec and held for 10 seconds. Then, the specimens were pulled up to a height of 20 mm from the starting position at a speed of 0.5 mm/sec, and the tensile deformation rates with respect to a specimen thickness of 12 mm were recorded when the stress was no longer shown. In the case where the stress was shown up to a height of 20 mm from the starting position, the cured silicone products were adhered to the probe and deformed and couldn't be stripped away.

[Bond Line Control]

The bond line control performance of the specimens were evaluated by measuring the thickness of the specimens after subjecting a stress of 50 N at a speed of 0.5 mm/sec to them and holding for 10 seconds using the above-mentioned texture analyzer. The measurement of thickness can be conducted using an conventional thickness gauge known in the art.

The following compounds or compositions were employed as the raw materials for the examples shown below. The viscosity was measured using a rotational viscometer as 25° C., and Vi content referred to the content of the vinyl group moiety ($CH_2=CH-$) in an alkenyl group.

Component (A)

A-1: a dimethylsiloxane capped at both molecular terminals with dimethylvinylsiloxy groups (viscosity: about 2000 mPa·s, Vi content: 0.21 mass %)

Component (B)

B-1: a methylhydrogensiloxane-dimethylsiloxane copolymer capped at both molecular terminals with trimethylsiloxy groups, which had an average of two silicon-bonded hydrogen atoms in the molecular, wherein an average of two silicon-bonded hydrogen atoms in the molecular were located on the side chains (viscosity at 25° C.: about 20 mPa·s, Vi content: 0.10 mass %)

B-2: a methylhydrogensiloxane-dimethylsiloxane copolymer capped at both molecular terminals with trimethylsiloxy groups, which had an average of two silicon-bonded hydrogen atoms in the molecular, wherein an average of zero silicon-bonded hydrogen atom in the molecular were located on the side chains (viscosity at 25° C.: about 10 mPa·s, Vi content: 0.15 mass %)

Component (C)

C-1: a complex of platinum and 1,3-divinyl-1,1,3,3-tetramethyldisiloxane (Pt content: about 0.5 wt %).

Component (D)

D-1: a crushed alumina filler (D50: about 9 μm)

D-2: a crushed alumina filler (D50: about 0.4 μm)

Component (E)

E-1: n-octyltrimethoxysilane

Component (F)

F-1: glass beads, GLASS BEADS UB-910L, D50: about 180 μm

F-2: glass beads, HUGHES CLASS IV BEADS, D50: about 250 μm

Component (G)

G-1: Phenyl Butynol

Component (H)

H-1: 29H,31H-phthalocyaninato(2-)-N29,N30,N31,N32 Copper/Dimethyl Siloxane, Trimethylsiloxy-terminated, (PIGMENT BLUE HARWICK STAN-TONE™ 40SP03-POLYONE)

TABLE 1

| Components | Practical Example 1 | Practical Example 2 |
|---|---|---|
| A-1 | 100 | 100 |
| B-1 | 5.6 | 3.2 |
| B-2 |  | 2.4 |
| C-1 | 0.2 | 0.2 |
| D-1 | 216 | 216 |
| D-2 | 468 | 468 |
| E-1 | 3.2 | 3.2 |
| F-1 | 4 |  |
| F-2 |  | 4 |
| G-1 | 0.0065 | 0.0065 |
| H-1 | 0.8 | 0.8 |

TABLE 1-continued

| Components | Practical Example 1 | Practical Example 2 |
|---|---|---|
| [H$_B$]/Vi content (molar ratio) | 0.72 | 0.41 |
| ([H$_B$] + [H$_{non-B}$])/Vi content (molar ratio) | 0.72 | 0.87 |
| [H$_{non-B}$]/([H$_B$] + [H$_{non-B}$]) | 0.00 | 0.53 |
| Hardness (Shore OO method) | 70 | 60 |
| Compressive Deformation (%) | 9 | 7 |
| Tensile Deformation (%) | −8 | −9 |
| BLT, 50N for 10 seconds | 173 | 230 |

TABLE 2

| Components | Comparative Example 1 | Comparative Example 2 |
|---|---|---|
| A-1 | 100 | 100 |
| B-1 | 5.6 | 1.5 |
| B-2 |  | 4.2 |
| C-1 | 0.2 | 0.2 |
| D-1 | 216 | 216 |
| D-2 | 468 | 468 |
| E-1 | 3.2 | 3.2 |
| G-1 | 0.0065 | 0.0065 |
| H-1 | 0.8 | 0.8 |
| [H$_B$]/Vi content (molar ratio) | 0.72 | 0.19 |
| ([H$_B$] + [H$_{non-B}$])/Vi content (molar ratio) | 0.72 | 1.00 |
| ([H$_{non-B}$]/[H$_B$]) + [H$_{non-B}$]) | 0.00 | 0.81 |
| Hardness (Shore OO method) | 68 | 61 |
| Compressive Deformation (%) | 13 | 7 |
| Tensile Deformation (%) | −11 | −11 |
| BLT, 50N for 10 seconds | 154 | 149 |

As is shown in tables 1 and 2, comparing to the comparative examples free of glass beads, the practical examples (the design value of thermal conductivity was 2.0 W/mK) containing the glass beads showed better peelability (therefore better reparability) due to the lower tensile deformation, and better BLT control due to the larger BLT values after being pulled under 50 N for 10 seconds.

It will be apparent to those skilled in the art that various modifications and variations can be made to the embodiments described here without departing from the spirit and scope of the claimed subject matter. Thus it is intended that the description covers the modifications and variations of the various embodiments described herein provided such modifications and variations come within the scope of the appended claims and their equivalents.

What is claimed is:

1. A thermally conductive silicone composition comprising:
(A) 100 parts by mass of an alkenyl group-containing organopolysiloxane having a viscosity of from 10 to 100000 mPa·s at 25° C.;
(B) an organohydrogenpolysiloxane having a viscosity of from 1 to 1000 mPa·s at 25° C. having an average of two to four silicon-bonded hydrogen atoms in a molecule, comprised at a quantity whereby an amount of the silicon-bonded hydrogen atoms in component (B) is 0.2 to 5 moles per mole of the alkenyl groups in component (A), wherein at least two of the silicon-bonded hydrogen atoms are located on the side chains of the molecule;
(C) a catalytic quantity of a hydrosilylation reaction catalyst;
(D) 400 to 3500 parts by mass of a thermally conductive filler;
(E) an alkoxysilane having an alkyl group containing 6 or more carbon atoms in a molecule, comprised at a quantity of from 0.1 to 2.0 mass % relative to component (D); and
(F) glass beads having a particle size within the range of 100 μm to 500 containing less than 0.1 mass % of iron, comprised at a quantity of from 0.1 to 10 parts by mass relative to 100 parts by mass of component (A).

2. The thermally conductive silicone composition according to claim 1, wherein component (E) is an alkoxysilane represented by the general formula:

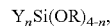

$Y_nSi(OR)_{4-n}$, wherein, Y is an alkyl group containing 6 to 18 carbon atoms, R is an alkyl group containing 1 to 5 carbon atoms, and subscript n is 1 or 2.

3. The thermally conductive silicone composition according to claim 1, wherein component (E) is a trialkoxysilane having an alkyl group containing 6 to 18 carbon atoms.

4. The thermally conductive silicone composition according to claim 1, wherein component (D) has been surface-treated with component (E).

5. The thermally conductive silicone composition according to claim 1, further comprising (G) a hydrosilylation reaction inhibitor.

6. The thermally conductive silicone composition according to claim 1, further comprising (H) a thermal stabilizer.

7. The thermally conductive silicone composition according to claim 1, wherein component (D) is:
(D1) a plate-like boron nitride powder having an average particle size of from 0.1 to 30 μm; or
(D2) a granular boron nitride powder having an average particle size of from 0.1 to 50 μm; or
(D3) a spherical and/or crushed alumina powder having an average size of from 0.01 to 50 μm; or
(D4) a graphite having an average particle size of from 0.01 to 50 μm; or
(D5) a mixture of at least two of (D1) to (D4).

8. The thermally conductive silicone composition according to claim 1, wherein component (B) contains (B1) a straight-chain organohydrogenpolysiloxane having an average of two to three silicon-bonded hydrogen atoms in a molecule, and wherein at least two of the silicon-bonded hydrogen atoms are located on the side chains of the molecule.

9. The thermally conductive silicone composition according to claim 1, wherein the content of the silicon-bonded hydrogen atoms in component (B) is represented as [H$_B$], the content of the silicon-bonded hydrogen atoms in an organohydrogenpolysiloxane other than component (B) is represented as [H$_{non-B}$], and the ratio of [H$_{non-B}$]/([H$_B$]+[H$_{non-B}$]) is within the range of 0.0 to 0.70.

10. A thermally conductive member produced by curing the thermally conductive silicone composition according to claim 1.

11. An electronic device having the thermally conductive member according to claim 10.

12. The electronic device according to claim 11, wherein the electronic device is a battery management system.

13. A manufacturing method of the electronic device of claim 11, including filling at least one gap in the electronic device with the thermally conductive silicone composition.

* * * * *